United States Patent [19]

Kobayashi

[11] Patent Number: 4,905,226

[45] Date of Patent: Feb. 27, 1990

[54] DOUBLE-BUFFERED TIME DIVISION SWITCHING SYSTEM

[75] Inventor: Tsuneo Kobayashi, Tokyo, Japan

[73] Assignee: NEC Corporation, Japan

[21] Appl. No.: 187,258

[22] Filed: Apr. 28, 1988

[30] Foreign Application Priority Data

Apr. 28, 1987 [JP] Japan .................................. 62-106060

[51] Int. Cl.$^4$ ........................................... H04Q 11/04
[52] U.S. Cl. .................................................... 370/66
[58] Field of Search .............................. 370/58, 66, 68

[56] References Cited

U.S. PATENT DOCUMENTS

| | | | |
|---|---|---|---|
| 3,967,070 | 6/1976 | Srivastava et al. | 370/66 |
| 4,068,098 | 1/1978 | Thyselius | 370/66 |
| 4,298,977 | 11/1981 | Abbott et al. | 370/68 |
| 4,510,597 | 4/1985 | Lewis | 370/66 |
| 4,759,010 | 7/1988 | Murata et al. | 370/66 |

Primary Examiner—Robert L. Griffin
Assistant Examiner—Wellington Chin
Attorney, Agent, or Firm—Laff, Whitesel, Conte & Saret

[57] ABSTRACT

The invention relates to a time division switching system which may transmit both voice and data signals. The data signals may be transmitted at a much higher speed than the voice signals, such as twice the speed, for example. To do this, the data signals are split into two time slots which are separately transmitted. Since the two time frames are so closely related, they must be transmitted within the same frame as a unit. This is done by a combination of two memory switches and control means for transmitting multi-element information. The two memory switches are used in an alternating sequence.

11 Claims, 13 Drawing Sheets

|  | EVEN FRAME (h) | | ODD FRAME (h+1) | |
|---|---|---|---|---|
| STATE OF 1060 | RESET | RESET | SET | SET |
| Q | 0 | 0 | 1 | 1 |
| DO OF MEMORY 105 | 0 | 1 | 0 | 1 |
| WE OF MS 102 | 0 | 0 | 0 | 1 |
| WE OF MS 101 | 1 | 1 | 1 | 0 |

FIG. 9

|  | EVEN FRAME (h) | | ODD FRAME (h+1) | |
|---|---|---|---|---|
| STATE OF 1070 | SET | SET | RESET | RESET |
| Q | 1 | 1 | 0 | 0 |
| DO OF MEMORY 103 | 0 | 1 | 0 | 1 |
| SELECT OF 1075 | MS 101 | MS 102 | MS 101 | MS 101 |

FIG. 10

DOUBLE-BUFFERED TIME DIVISION SWITCHING SYSTEM

BACKGROUND OF THE INVENTION

1. Field of the Invention

The present invention relates to a double-buffered time division switching system for use in a network capable of simultaneously handling telephone exchange service and non-telephone service including high speed and wide band communication service.

2. Description of the Prior Art

A time division switching system switches connections between two channels of two different time division multiplex communication paths.

Known time division time switches utilize a memory switch and a control memory. Input signals on the channels on a number of input lines, for instance N lines, are written into the memory switch. The signals are then read out in a prescribed sequence (which is different from the sequence of the writing of the input signals into this memory switch) the read out signals are output into the channels on the N different output lines. This enables a connection of the N communication lines connected to the output side with the N communication lines connected on the input side in any desired combination on a channel basis.

The control memory is used to supply read addresses for the memory switch. Read addresses for the N lines, i.e., N such addresses, are written into the control memory and read out in a prescribed sequence and then are supplied to the memory switch.

To change the connection between channels, the corresponding read address written into the control memory is altered.

A frame is a round of actions to sequentially store all the signals for the N lines and to read these signals for the N lines in a prescribed sequence with the memory switch. If the time length of this single frame is selected to be 125 microseconds and signals for a single line (or a single channel) are eight-bit digital signals, 8 (bits)/125 (microseconds)=64K bits are switched (for instance in a telephone exchange) per second per line. Such a process of switching will be hereinafter referred to as 64K b/s switching.

However, if data transmission is to be achieved through a data terminal having a transmission speed which is higher than 64K b/s which is connected to a 64K b/s switching system, a series of data will be split into two or more time slots within a frame and will be separately transmitted (two time slots are used if the bit rate is 64K b/s×2=128K b/s). Since these separate groups of data have close relations and continuity among one another within the same frame, they have to be within the same frame when inputted or output by a time division switch. However, since a conventional time division switch cannot preserve the same sequence of signals on the input side and the output side, high speed data switching cannot be achieved in such an instance unless some special arrangement is made.

The following description concerns, as an example, a case in which a multiplex-time-division communication path of 128 channels per frame is handled with a time division switch.

FIG. 1 illustrates a typical three-stage time division switching system having a primary switch PSW (time division switch), a secondary switch (space division switch) and a tertiary switch TSW (time division switch). In the time division switches constituting the primary and tertiary switches, eight-bit data of one of the 128 channels is allocated for each time slot on the input slot. This eight-bit data is inserted into any desired time slot on the output side to be output.

If, as illustrated in FIG. 2(a), there are two mutually related data X1 (8 bits) and X2 (8 bits), i.e., two data of 64K b/s×2, belonging to a single frame in input time slots (ITS's) No. 0 and No. 4, respectively, and if the data X1 and X2 are inserted into unoccupied output time slots (OTS's) No. 0 and No. 6, respectively, selected by the time division switch, to be output, these data X1 and X2 will be output in the same frame so that their relativity will be preserved. However, if OTS No. 0 and No. 1 are selected, as shown in FIG. 2(b), for outputting two 64K b/s data X1 and X2, respectively, the data X2 cannot be written into the memory switch in time for its read out (insertion into OTS No. 1), so that the data X2 in the preceding frame (a cycle before) will always be output into OTS No. 1. Then, the sequence between the data X1 and X2 cannot be preserved. The relativity between them cannot be maintained at the data terminal on the receiving side. If the algorithm of software is designed to so select OTS's in the time division switch as to read out the data after their writing into the memory switch always within the same frame, as shown in FIG. 2(a), the sequence and relativity will be preserved even in such switching of 64K b/s×2. However, it will invite increases in the time required for the processing of an unoccupied time slot selection and in the block ratio, resulting in a reduction of the processing capacity of the switching system.

Meanwhile, U.S. Pat. No. 3,967,070 discloses an example of a double-buffered time division switch in which two memory switches are used, one in the read mode when the other is in the write. The two memory-switches are alternately switched back and to forth. A use of such a time division switch for switching 64K b/s×n data, as referred to above, would make it possible to preserve the sequence and relativity among the data.

However, the control which switches the modes of the two memories in a strictly periodic way entails the following problem. Where 64K b/s speech signals are switched with such switches, depending on the relationship between a write time W and a read time R determined commonly for two memories A and B, the length of time T taken by each memory from the write time W until the read time R, as shown in FIG. 3, will become close to two frames (2×125 microseconds) at the maximum. This is twice the time required by a conventional single-memory system. Moreover, a signal passing through a number of such stages of time division switches would result in further amplification of the delay and a consequent deterioration of the quality of speech.

SUMMARY OF THE INVENTION

An object of the present invention is, therefore, to provide a double-buffered time division switching system which prevents unnecessary transmission delays while preserving the reliability and processing capacity of the switching system, where there are two or more mutually related data split from each other in a single frame on a time division communication path (i.e., 64K b/s×n switching), by alternately writing into and reading out of two memory switches only such data on a frame-by-frame basis.

In order to achieve the foregoing object, a double-buffered time division switching system is provided. According to the invention. This system comprises: first and second k-bit×N-multiplex memory switches having N time slots per frame which are sequentially inputted time division multiplexed data. Either of the memory switches is placed in a write state; A control memory stores the read sequence of data in the first and second switches.

First and second multi-element information memories store multi-element information which corresponds to a plurality of input time slots. constitutes a series of data in the frame. These time slots are multi-element data. A first control means checks first multi-element information memory in synchronism with the writing of input time slots into the memory switches. If the stored multi-element information corresponds to the time slots into which it is written. The first control means alternately switches the data writing of the time slots between the first and second memory switches on a frame-by-frame basis. and A second control means checks the second multi-element information memory in synchronism with the reading into output time slots from the memory switches. If the stored multi-element information corresponds to the output time slots, the second control means outputs the information into the output time slots, alternately reading data out of the first memory switch and reading out of the second memory switch on a frame-by-frame basis.

BRIEF DESCRIPTION OF THE DRAWINGS

The objects and features of the present invention will become more apparent from the detailed description hereunder when taken in conjunction with the accompanying drawings, in which:

FIGS. 9 and 10 are operating state charts for FIG. 8;

In the drawings, the same reference numerals denote the same or corresponding structural elements.

DETAILED DESCRIPTION OF THE PREFERRED EMBODIMENT

Figure 4:
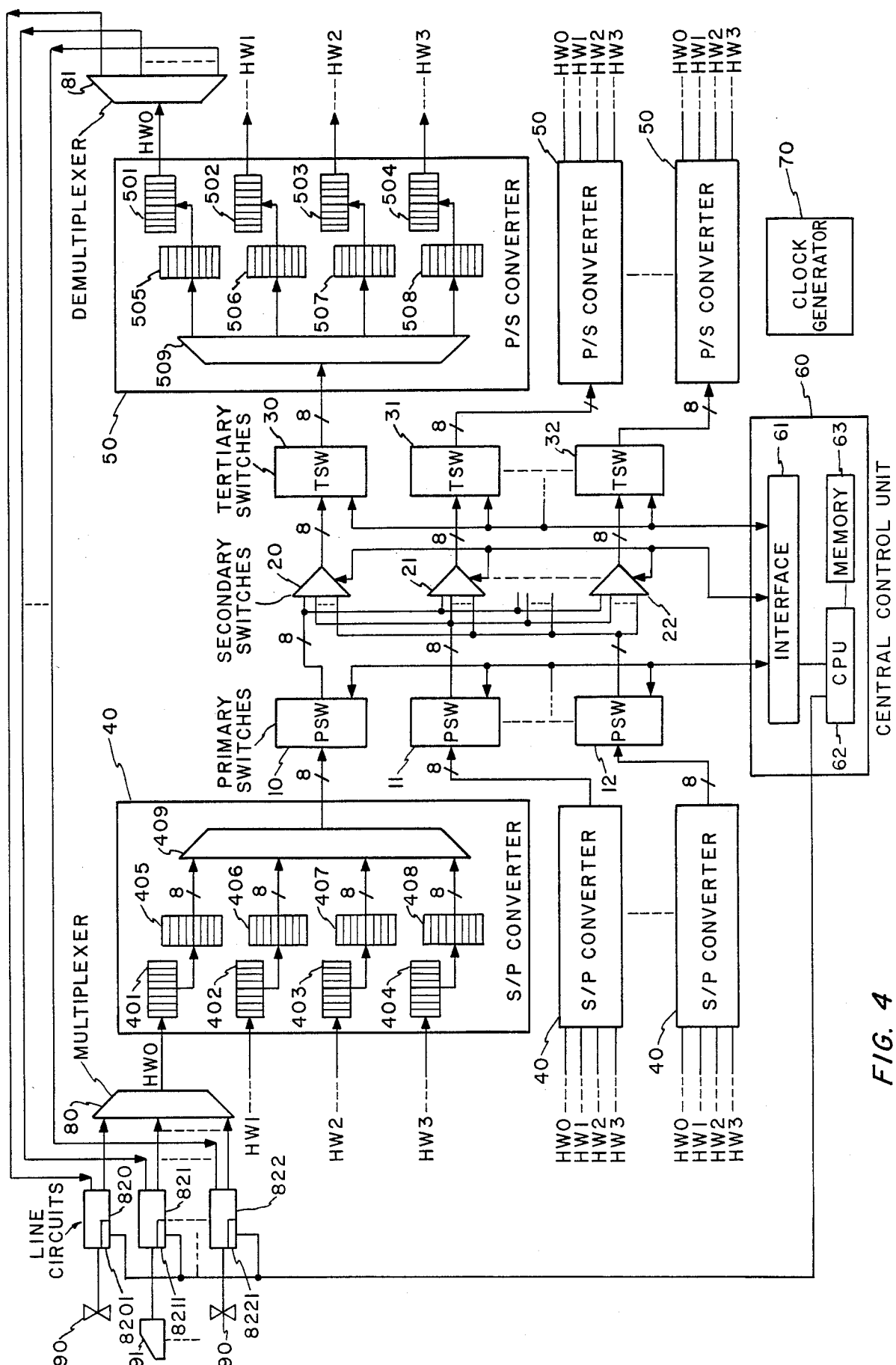
FIG. 4 is a block diagram illustrating a preferred embodiment of the invention.

Referring to FIG. 4, a preferred embodiment of the present invention is provided with a plurality of primary switches (time division switches) (PSW's) 10 to 12, a plurality of secondary switches (space division switches) (SSW's) 20 to 22, a plurality of tertiary switches (time division switches) (TSW's) 30 to 32, a central control unit (CC) 60 for controlling the whole switching system; and a clock generator 70 for supplying each part of the switching system with a 12 MHz clock pulse CL and a frame head pulse FH in 125 microsecond cycles.

The plurality of the PSW's 10 to 12 and the primary switches plurality of the tertiary switches TSW's 30 to 32 are identically structured time division switches. The plurality of the SSW's 20 to 22 are identically structured space division switches.

To the input side of each of the PSW's 10 to 12 is connected a serial/parallel (S/P) converter 40. The output side of each PSW is distributed to the inputs of the SSW's 20 to 22. Each of the SSW's 20 to 22 connects any PSW with any TSW in a response to a designation by the central control unit CC 60. The output of each of the TSW's 30 to 32 is connected to a parallel/serial (P/S) converter 50.

To the input of each of the S/P converters 40 are connected four upward highways (HW's) 0 to 3. To the input end of each of these HW's 0 to 3 is connected a multiplexer 80. The input of the multiplexer 80 is connected to telephones 90 and a data terminal 91 via a plurality of line circuits 820 to 822.

To the output of each of the P/S converters 50 are connected four downward HW's 0 to 3. To the output end of each of these HW's 0 to 3 is connected a demultiplexer 81. The output of the demultiplexer 81 is connected to telephones 90 and the data terminal 91 via the plurality of line circuits 820 to 822.

The central control unit CC 60 is provided with a central processing unit (CPU) 62, a CPU interface 61 for transmitting data to control the switches 10 to 12, 20 to 22 and 30 to 32, and a memory 63. The CPU 62 is connected to interfaces 8201 to 8221 of the line circuits 820 to 822 for transmitting and receiving date which is necessary for the switching operation. The memory 63 memorizes different kinds of data transmission speed corresponding to the accommodating position information vis-a-vis the switching system with respect to the telephone 90 and the data terminal 91.

The following description will refer to speech communication using the telephone 90 as switching of 64K b/s and data transmission using the data terminal 91 as switching of 64K b/s×2.

Next will be explained, with reference to FIG. 5, the outline of data transmission in the system illustrated in FIG. 4. From the multiplexer 80 digital data is time-division-multiplexed into 32 channels (eight-bit serial data per channel) per frame (125 microseconds) (FIGS. 5(c), (d), (e) and (f)).

The eight-bit data of each of the channels CH0 to CH31 are successively inputted to eight-bit registers 401 to 404, and stored in eight-bit registers 405 to 408 as eight-bit parallel data, in response to a latch pulse of 2.048 MHz (FIG. 5(g)).

A multiplexer 409 multiplexes these eight-bit parallel data in the registers 405 to 408 into 128 channels per frame, and enters them into the PSW's 10 to 12 as data for time slots Nos. 0 to 127 (FIGS. 5(h) and (i)). The primary switches PSW's 10 to 12, whose operation will be described in further detail hereinafter, generally accomplish time slot conversion. The secondary switches SSW's 20 to 22 achieve a desired connection to the TSW's 30 to 32, which effect further time slot conversion.

Figure 5:
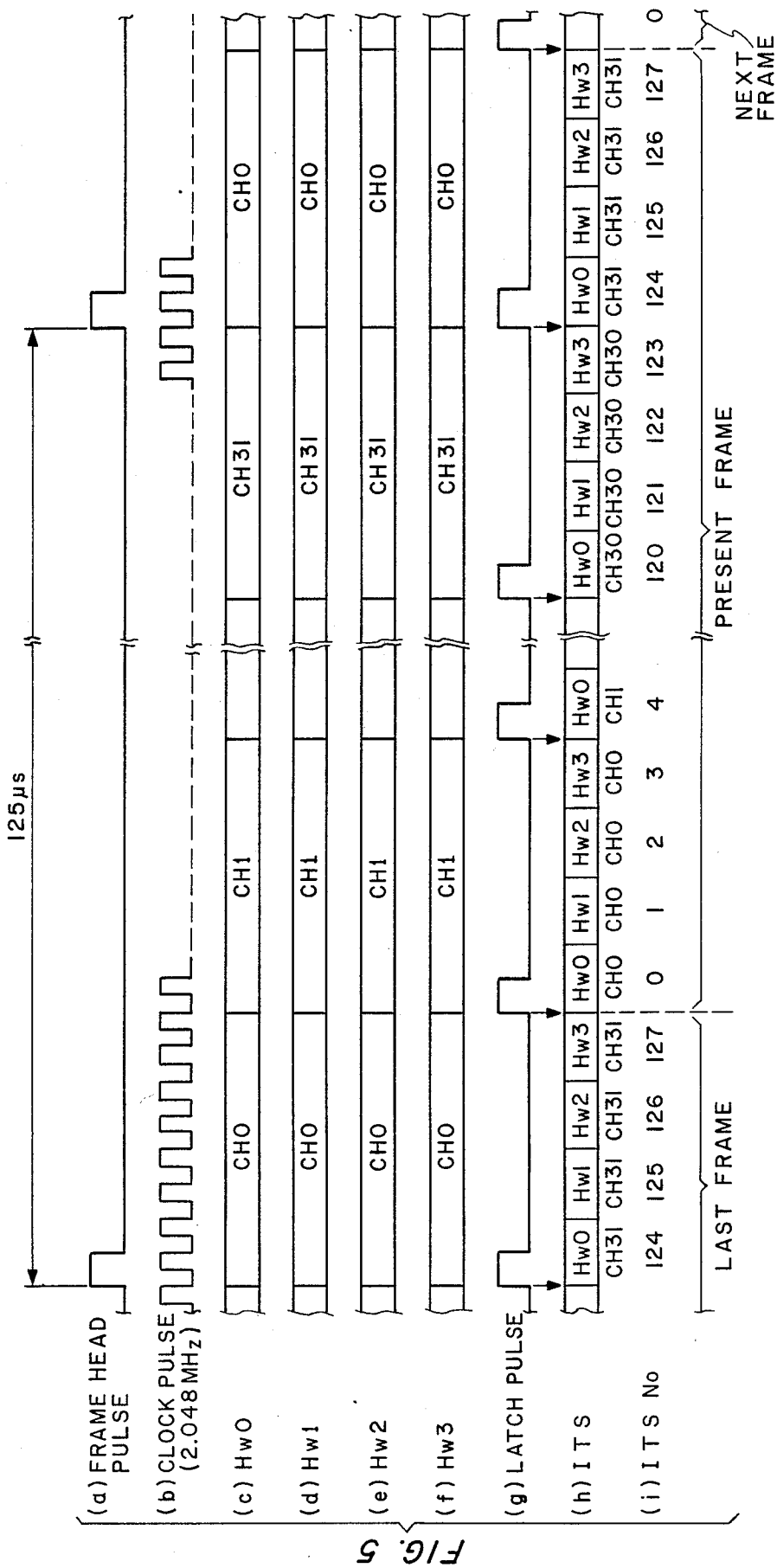
FIG. 5 is a time chart for describing an outline of the data transmission method of FIG. 4.

The P/S converter 50 operates in a way which is reverse to the way that is shown in FIG. 5. Thus, the parallel data multiplexed into 128 channels are demultiplexed by a demultiplexer 509 into 32 channels, and converted into 32 channel-multiplexed serial data via eight-bit registers 501 to 508. The serial data are further demultiplexed by the demultiplexers 81 to be supplied to the line circuits 820 to 822 of each subscriber or data line. The foregoing operation makes communication possible between any desired telephones or data terminals.

Figure 6:
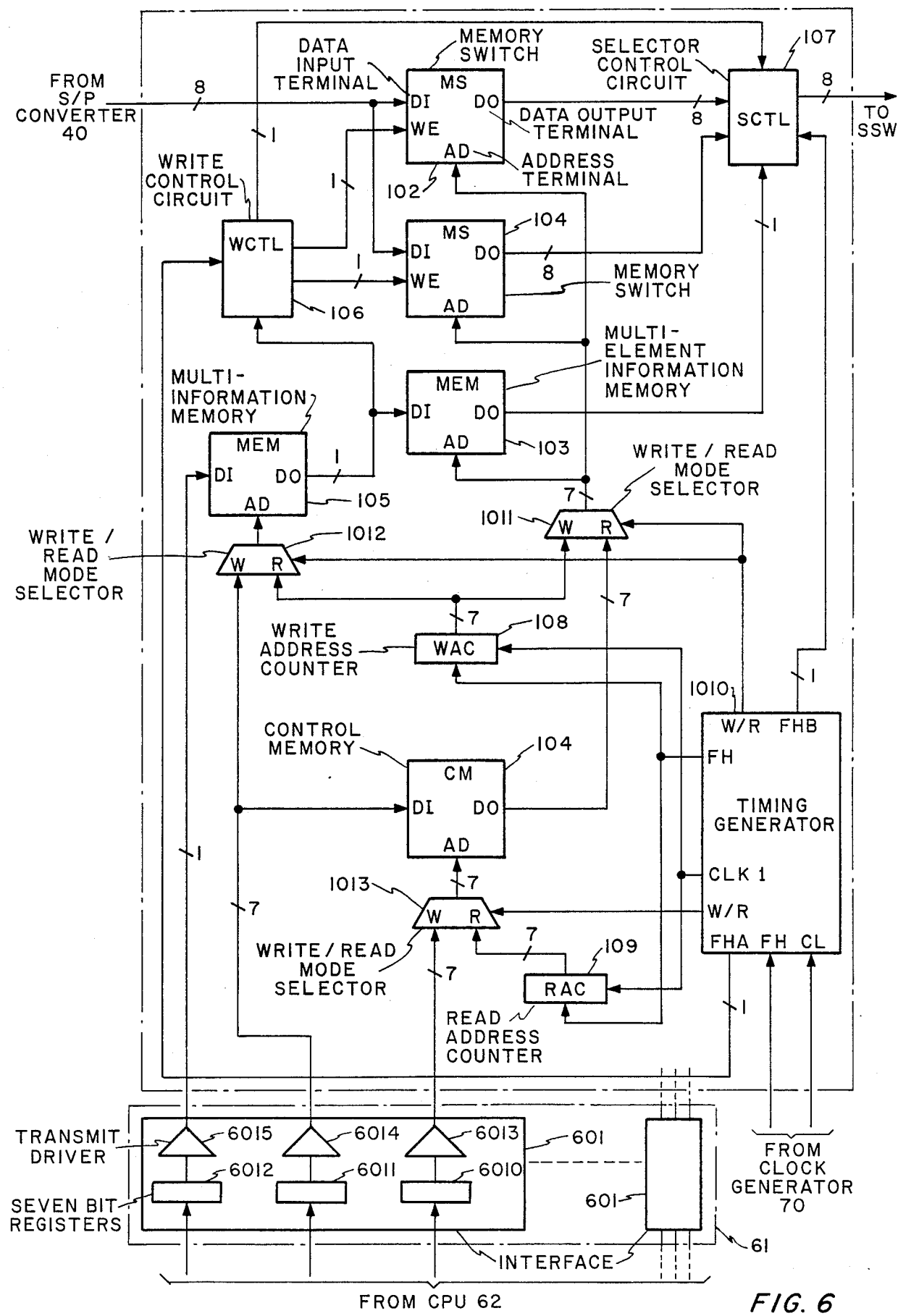
FIG. 6 is a block diagram illustrating a part of FIG. 4 in further detail.

Next will be described the structure of the time division switches, which constitute a characteristic feature of the present invention, with reference to FIG. 6. The PSW 10 is provided with two 8-bit×128-multiplex memory switches (MS's) 101 and 102. A second 1-bit×128-multiplex multi-element information memory (MEM) 103 stores information (one-bit data) concerning whether or not the aforementioned 64K b/s×2 switching is to be done (this information will be hereinafter after referred to as multi-element information MEI) corresponding to an input time slot number (of seven bits).

A 7-bit×128-multiplex control memory (CM) 104 stores the read addresses (of seven bits each) of the memory switches MS's 101 and 102 and the MEM 103. A first 1-bit×128-multiplex multi-element information memory (MEM) 105 stores the multi-element information MEI corresponding to an input time slot number (of seven bits). A write control circuit (WCTL) 106 places either one of the MS's 101 and 102 in the write stage. A selector control circuit (SCTL) 107 makes effective and supplies the output of either one of the MS's 101 and 102.

A 128-nary write address counter (WAC) 108 supplies write addresses (of seven bits each) to the memory switches MS's 101 and 102 and the MEM 103. A 128-nary read address counter (RAC) 109 for supplies a read address (of seven bits) to the control memory 104. A timing generator 1010 for supplies various clock pulses and a timing pulse. Write mode/read mode selectors are numbered 1011 to 1013.

In the following description, the input time slot number and output time slot number of the time division switch 10 will be abbreviated to ITSNO and OTSNO, respectively.

Figure 1:
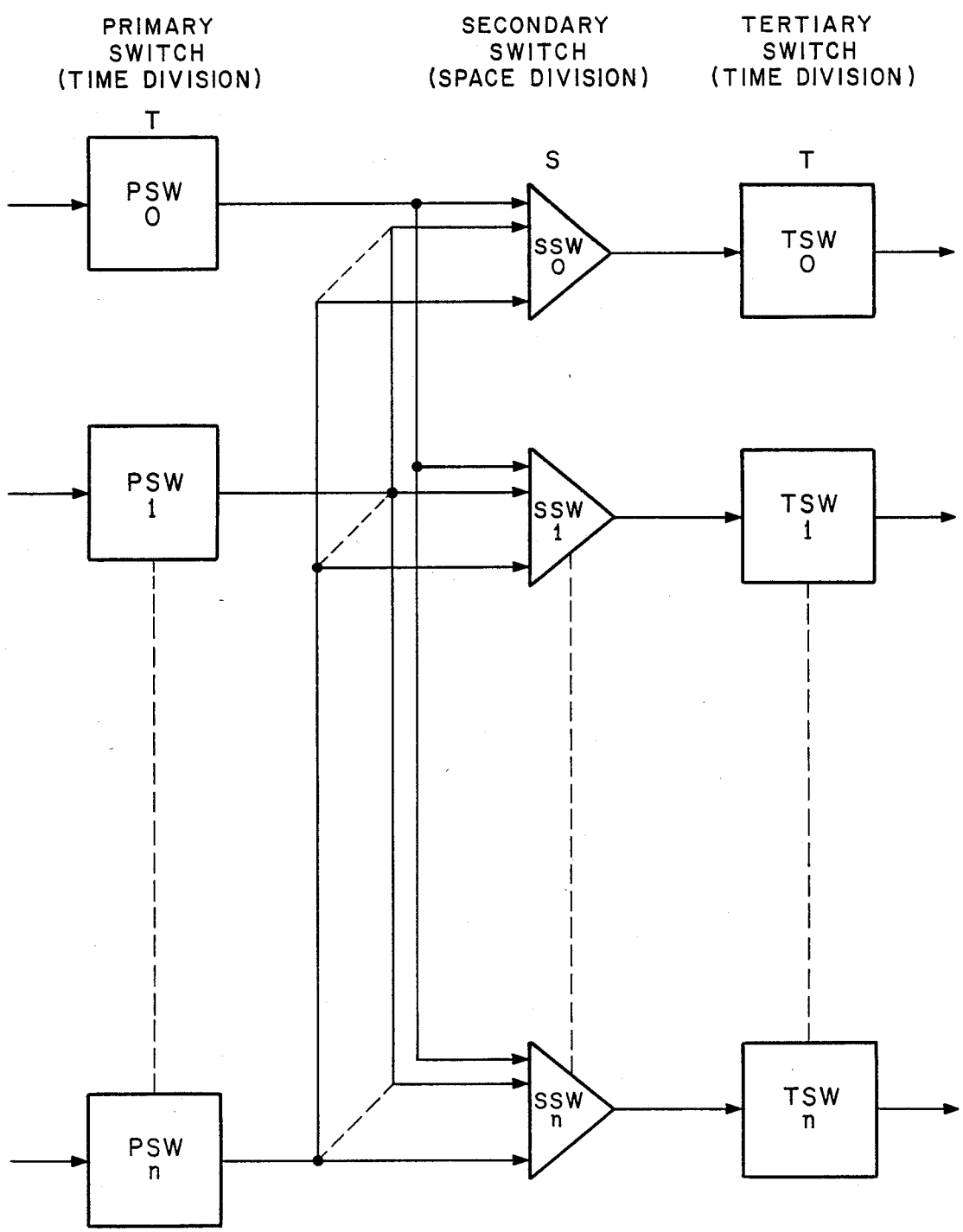
FIG. 1 is a block diagram illustrating a typical three-stage switching structure used in a switching system.
Figure 2:
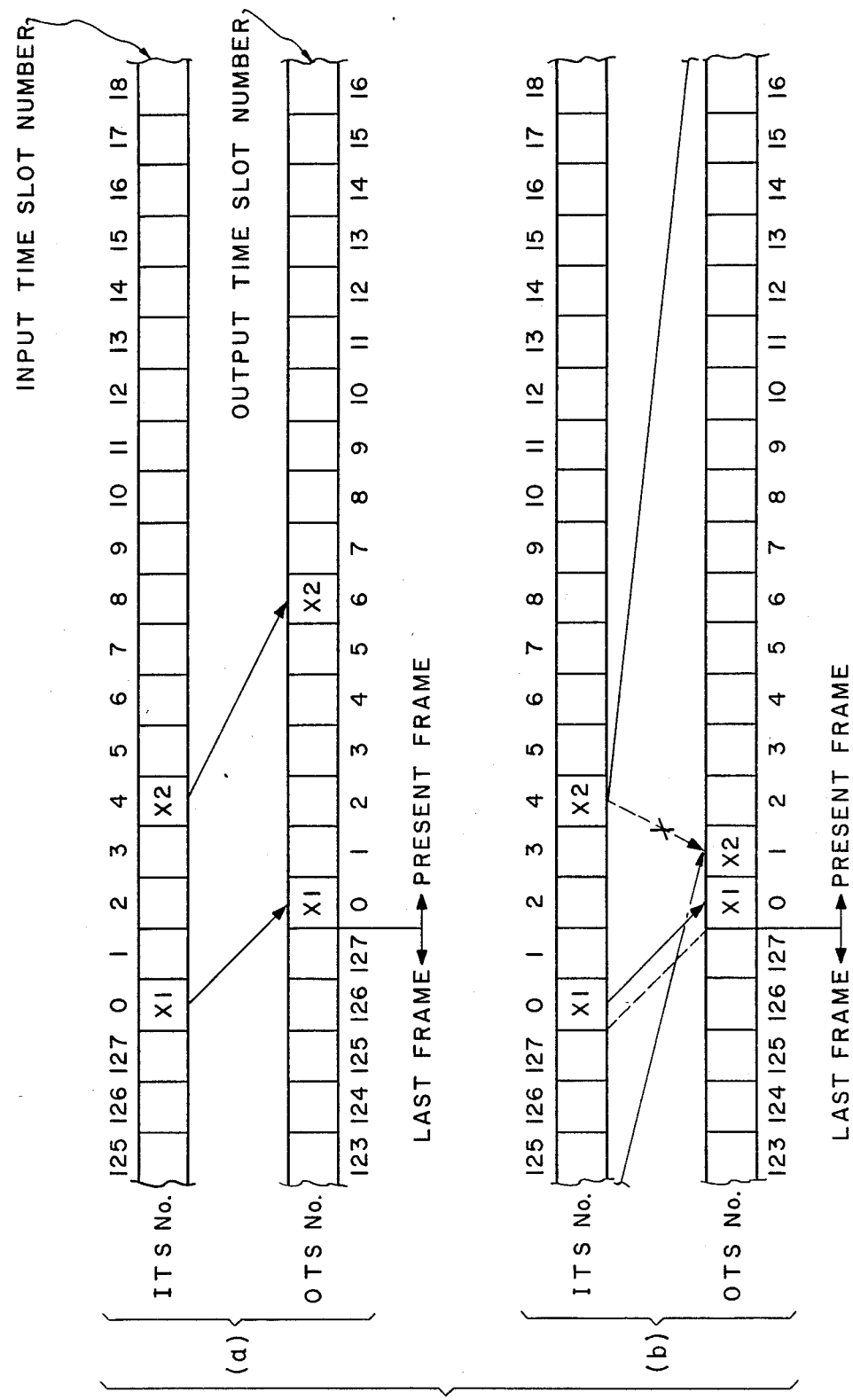
FIGS. 2 and 3 are time charts for describing the operation of a prior art system.
Figure 7:
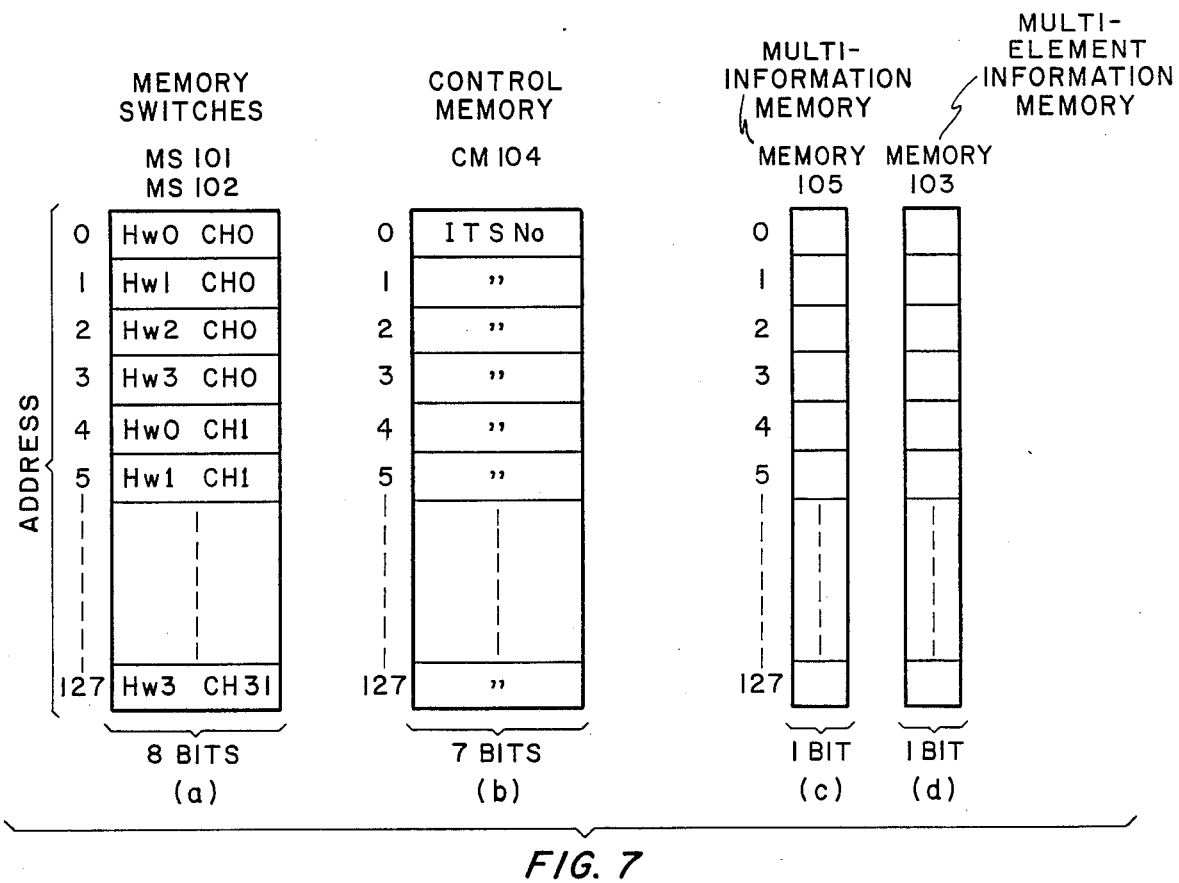
FIGS. 7 and 8 are block diagrams illustrating parts of FIG. 6 in further detail.
Figure 3:
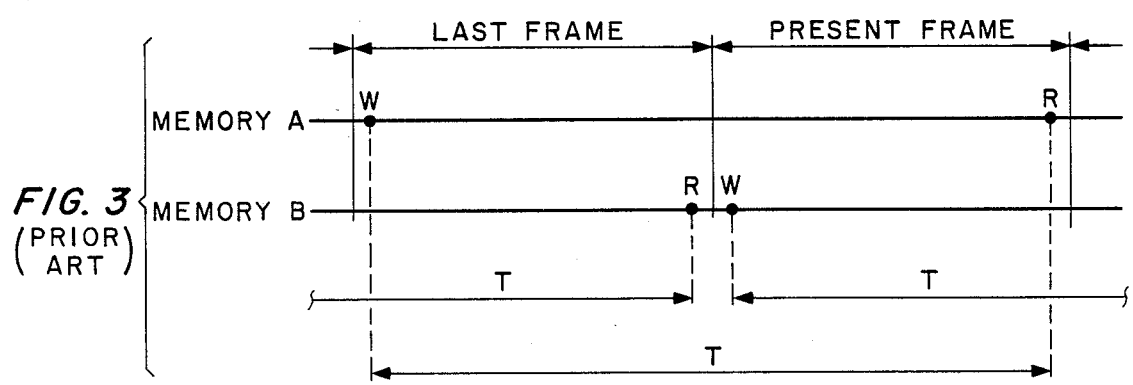

In the memory switches MS's 101 and 102, as shown in FIG. 7(a), are stored data received on each channel. In the control memory CM 104 (FIG. 6), as shown in FIG. 7(b), are stored the input time slot numbers ITSNO's corresponding to addresses (i.e. output time slot numbers OTSNO's). In the MEM 105 is stored the multi-element information MEI corresponding to the addresses (i.e. ITSNO's) as shown in FIG. 7(c), and so is in the MEM 103, corresponding to addresses (i.e. ITSNO's) as shown in FIG. 7(d).

In the memories 101 to 105 (FIG. 6), the DI terminal stands for a data input terminal; the DO terminal, a data output terminal, and the AD terminal, an address input terminal.

The timing generator 1010, receiving the frame head FH pulse and CL pulse from the clock generator 70 (FIG. 4), generates FHA and FHB pulses at every 125 microseconds, a W/R clock pulse (2.048 MHz) for switching the write/read modes of the memories and selectors, and a clock pulse CLK 1 (1.024 MHz) for counting of the counters 108 and 109, and supplies these pulses together with the FH pulse.

The selectors 1011 to 1013 output the inputs of W terminals when in the write (W) mode and inputs of R terminals when in the read (R) mode.

Meanwhile, the interface 61 of the central control unit CC 60 is provided with an interface circuit 601 corresponding to each of the time division switches 10 to 12 and 30 to 32. The circuit 601 is provided with a seven-bit register 6010 and a transmit driver 6013 for inputting output time slot numbers OTSNO's as addresses of the CM 104, a seven-bit register 6011 and a transmit driver 6014 for inputting input time slot number ITSNO's as data of the control memory CM 104, and a one-bit register 6012 and a transmit driver 6015 for inputting the multi-element information MEI as data of the MEM 105. Since the data from the registers 6010 to 6012 are transmitted at the same timing, these registers may be integrated as required (for instance the registers 6011 and 6012 may be structured as a single eight-bit register).

Figure 8:
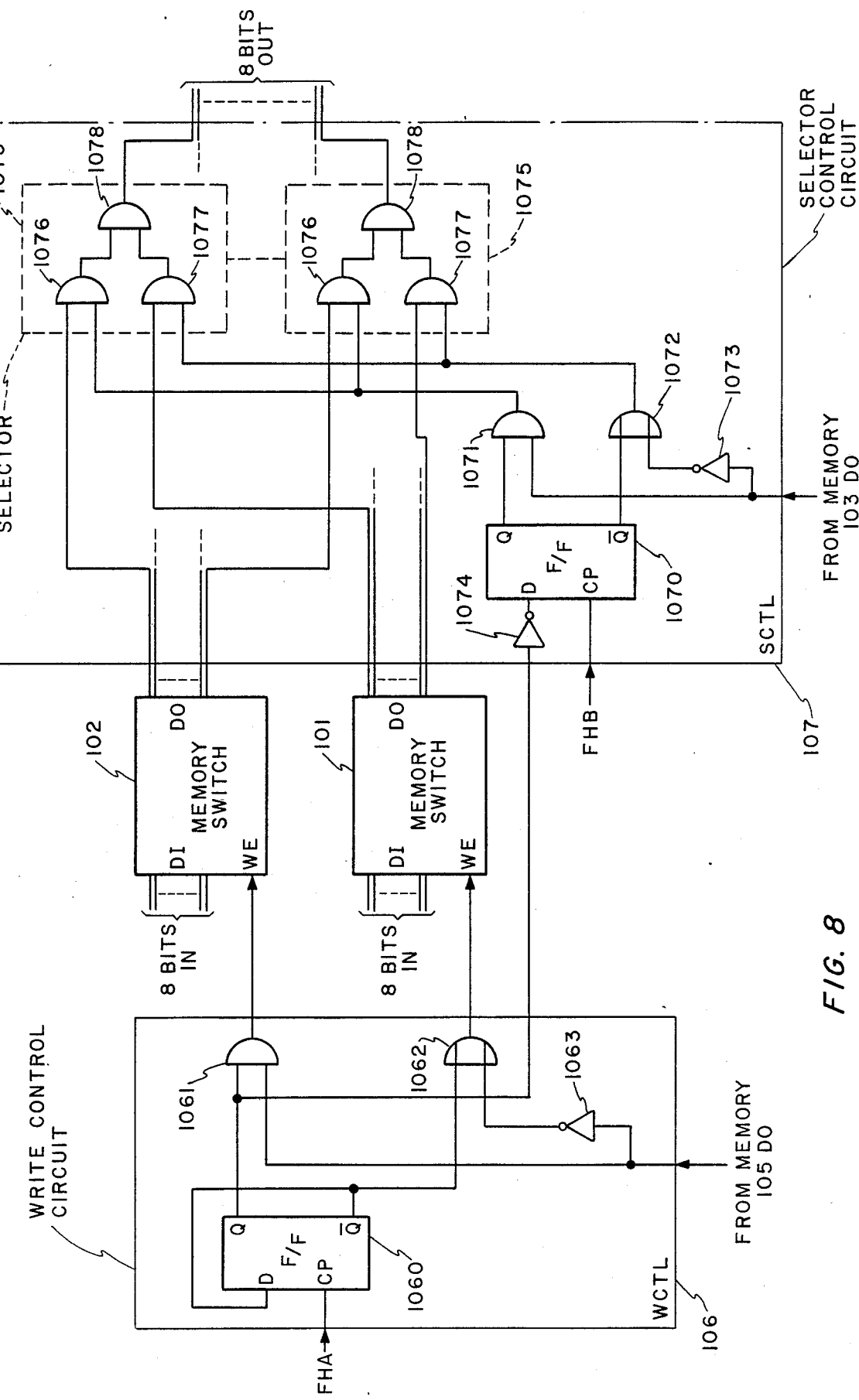

Now referring to FIG. 8, the write control circuit WCTL 106 is provided with flip-flop (FF) 1060, an AND gate 1061, an OR gate 1062 and an inverter 1063. To the CP terminal of the FF 1060 is inputted the FHA pulse. One of the inputs of the AND gate 1061 and of the input of the inverter 1063 are connected to the DO terminal of the MEM 105 (FIG. 6), to be supplied with the MEI. Meanwhile, the SCTL 107 is provided with a FF 1070, an AND gate 1071, an OR gate 1072, inverters 1073 and 1074, and selector circuits 1075 for eight-bit equivalents. To the CP terminal of the FF 1070 is inputted the FHB pulse, and to its D terminal is inputted the Q output of the FF 1060 of the WCTL 106 via the inverter 1074. The selector circuit 1075 consists of AND gates 1076 and 1077 and an OR gate 1078. The operating states of the WCTL 106 and SCTL 107 are shown in FIGS. 9 and 10, respectively.

Figure 11:
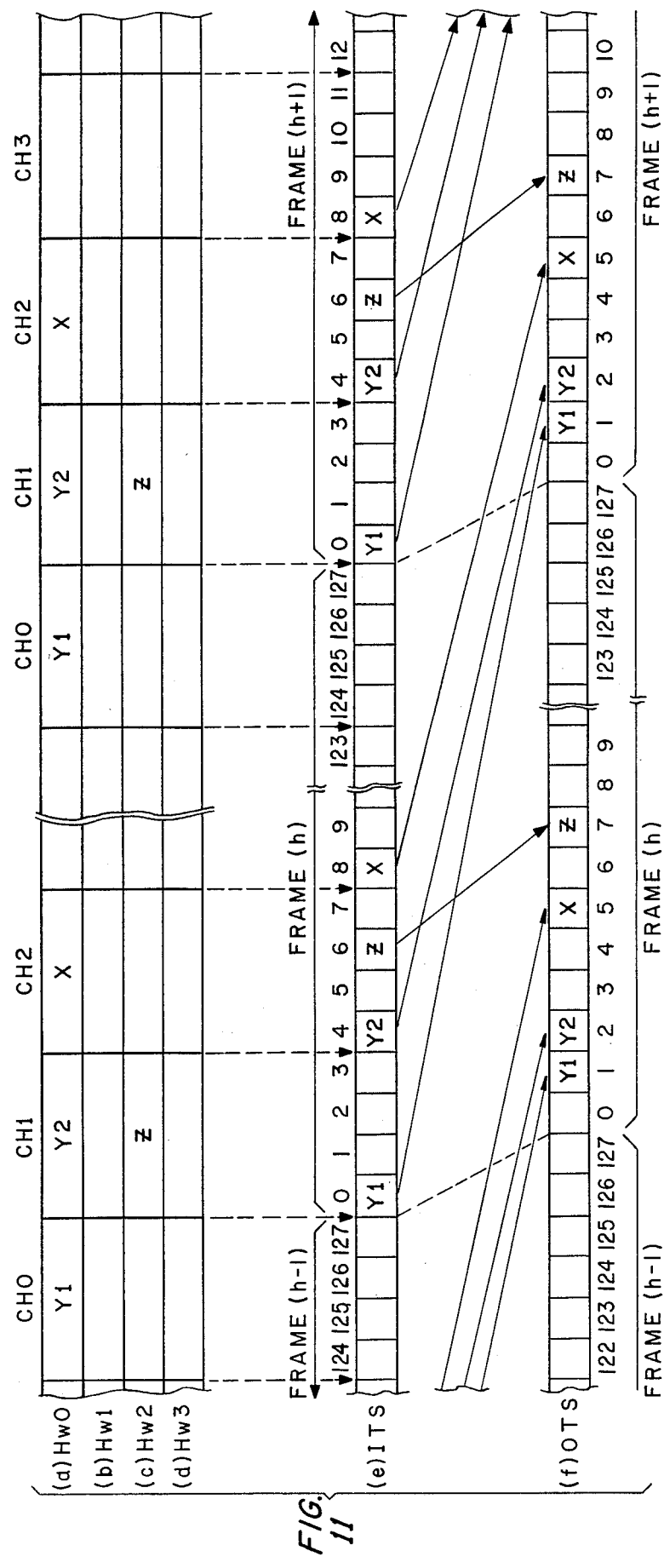
FIG. 11 is a time chart for explaining the operation of the embodiment of FIG. 4.

Next will be described the operation of the time division switch 10 with reference to FIGS. 4, 6, and 8 to 16. As shown in FIG. 11, in the input from the highway HW 0, eight-bit data Y1 and Y2 on the channels CH0 and CH1, respectively, are multi-element data constituting a set of data in a single frame. Accordingly, the data terminal 91 (FIG. 4) having a transmission speed of 128K b/s requires switching of 64K b/s×2. As regards these two data Y1 and Y2, as stated above, data of the input time slots of the same frame should always be inserted into the output time slots of the same frame. Meanwhile to the channel CH2 of the highway HW 0 and the channel CH1 of the highway HW 2, there are inputted eight-bit data X and Z sampled from speech signals from two separate telephones 90 in 125 microsecond cycles. These independent data are switched at 64K b/s. In this embodiment, one-bit data "1" is used to indicate switching at 64K b/s×2, and one-bit data "0" to indicate switching at 64K b/s, as the multi-element information MEI.

In FIG. 4, suppose that the telephone 90 and the terminal 91 accommodated in the highway HW 0 and the telephone 90 accommodated in the HW 1 request an initiation of a call at the same time. The CPU 62 of the central control unit CC 60 receives these call initiation requests from the corresponding line circuits 820 and 821 through the interfaces 8201 and 8211, and begins the known procedure of call initiation control. At this time the CPU 62 identifies the accommodating positions of the two telephones 90 and one terminal 91 in the switching system and, by checking the memory 63, perceives whether each equipment requires 64K b/s×2 switching or 64K b/s switching. According to the responses of the telephones and terminal of the called parties, the channels CH0, CH1 and CH2 on the HW 0 and the channel CH1 on the HW 1 are allocated for line connection as described with reference to FIG. 11. The CPU 62 recognizes the input time slot number ITSNO's for data X, Y1, Y2 and Z, and an unoccupied time slot is selected out of the output time slot OTS's corresponding to each data. It is supposed here that the input time slot number ITSNO's corresponding to the data Y1, Y2, X and Z are 0, 4, 8 and 6, respectively, and the output time slot number OTSNO's 1, 2, 5 and 7 are selected accordingly.

Figure 12:
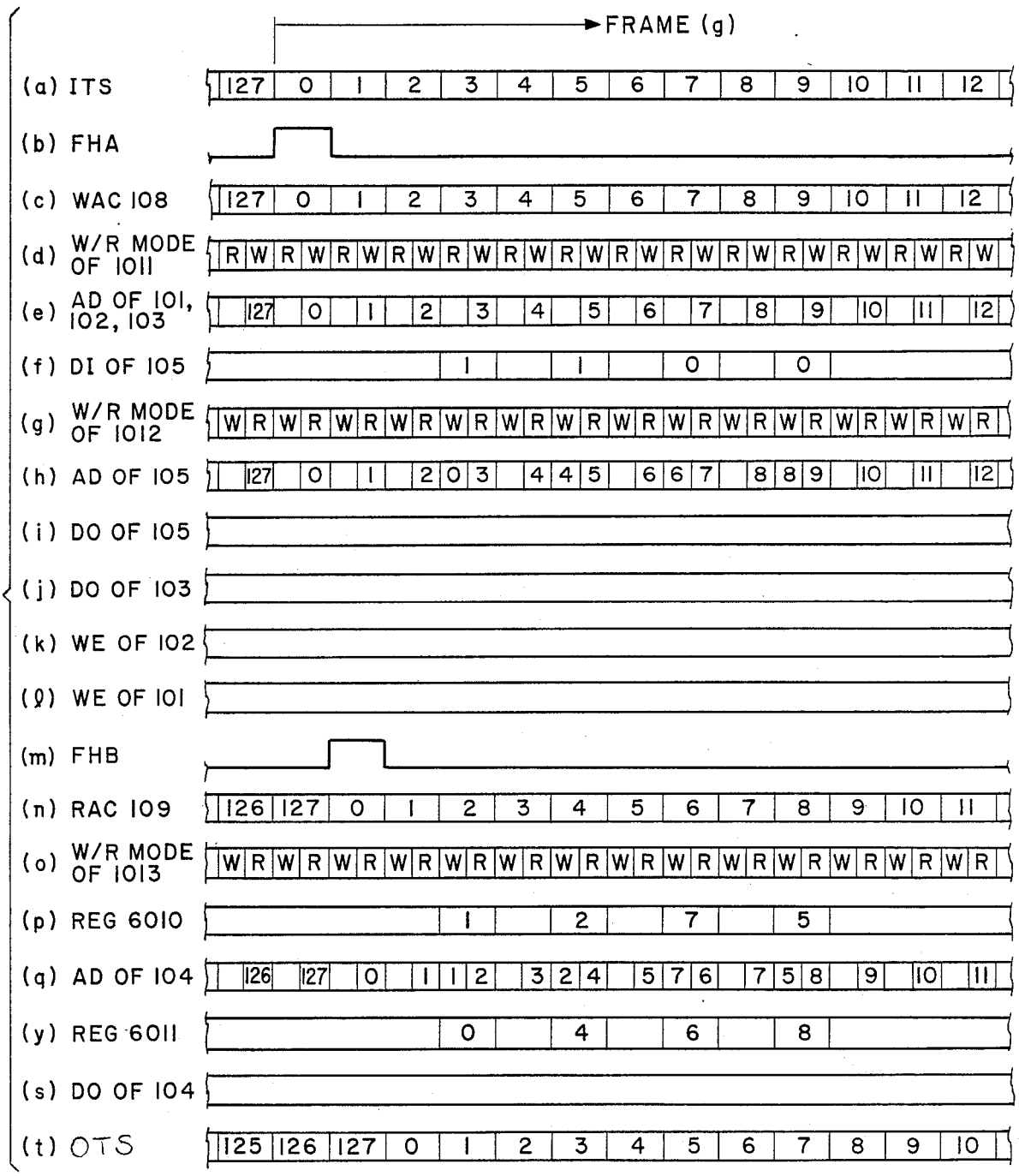
FIGS. 12 to 14 are time charts for explaining the operation in FIG. 6.
Figure 15:
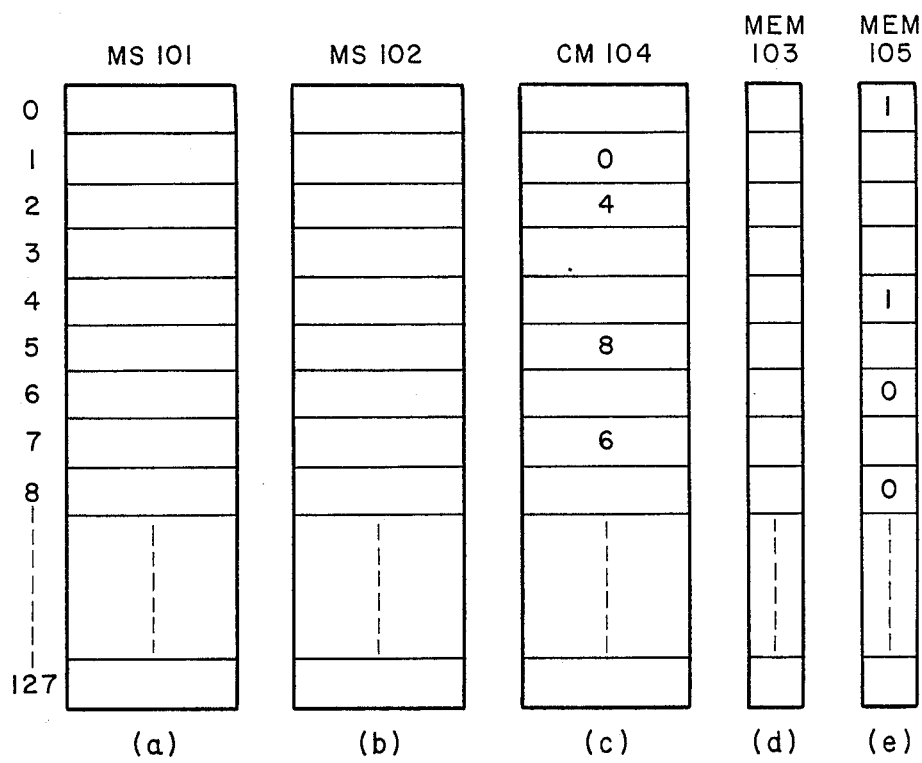
FIGS. 15 and 16 are diagrams illustrating the storage states of the two respective memories shown in FIG. 6.

Next, as shown in FIG. 12, the CPU 62 causes necessary data to be stored in the cover memory CM 104 and the multi-element information memory MEM 105 at any desired timing in frame (g) prior to a connection of the lines. Thus, in FIG. 12, when the count of the read address counter RAC 109 is "2", "4", "6" and "8" (FIG. 12(n)), OTSNO's 1, 2, 7 and 5 (FIG. 12(P)) are respectively entered from the register 6010 as write addresses of the CM 104 (FIG. 12(q)). The ITSNO's 0, 4, 6 and 8 are entered from the register 6011 as data of the CM 104 (FIG. 12(r)) and write addresses of the MEM 105 multi-element information, and MEI's "1", "1", "0" and "0" are entered from the register 6012 as data of the MEM 105 (FIG. 12(f)). The states of the memories 101 to 105 upon completion of the writing of these control data are shown in FIG. 15.

Next will be described the operation during a connection of lines with reference to FIGS. 13 and 14.

Figure 13:
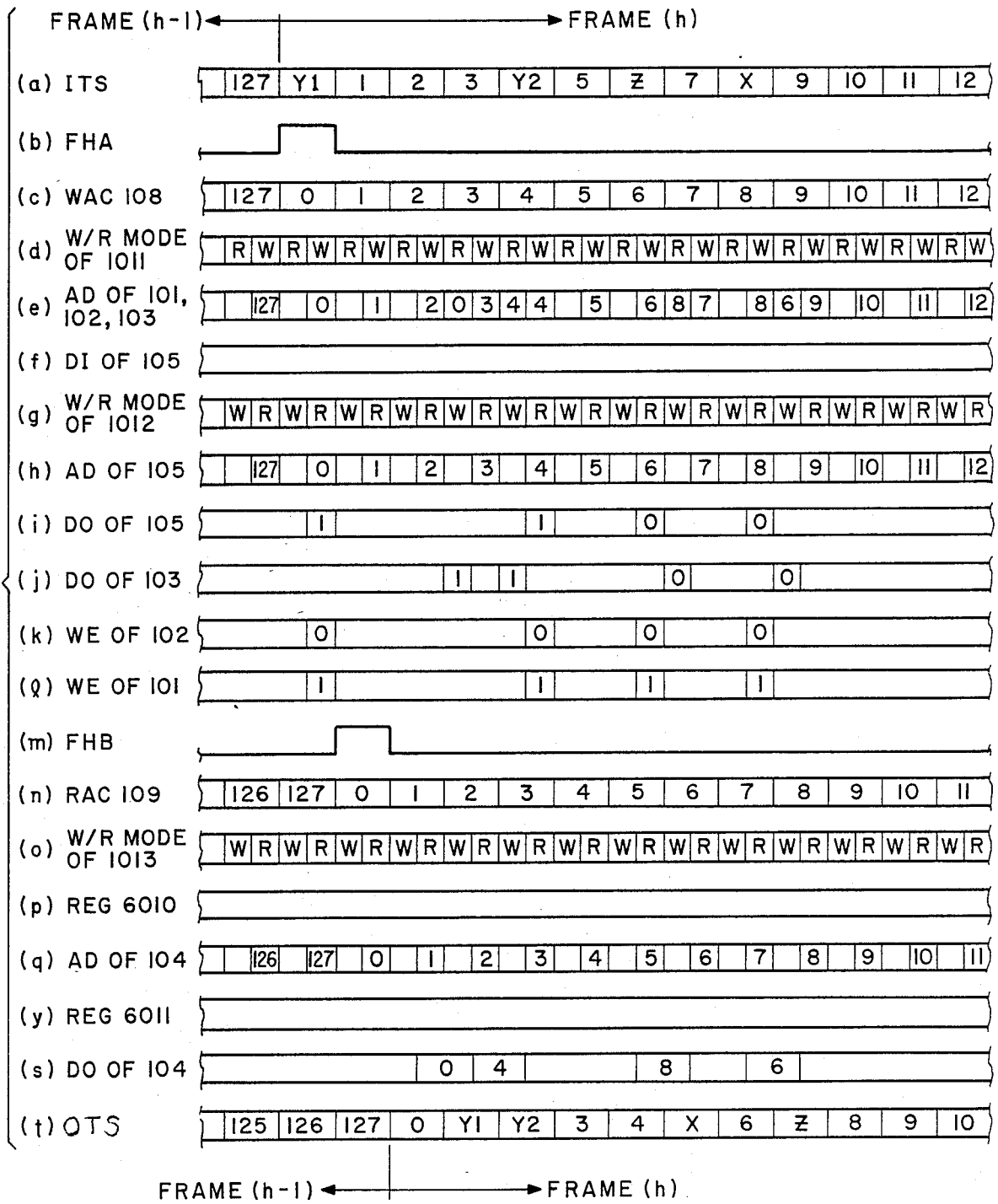
Figure 14:
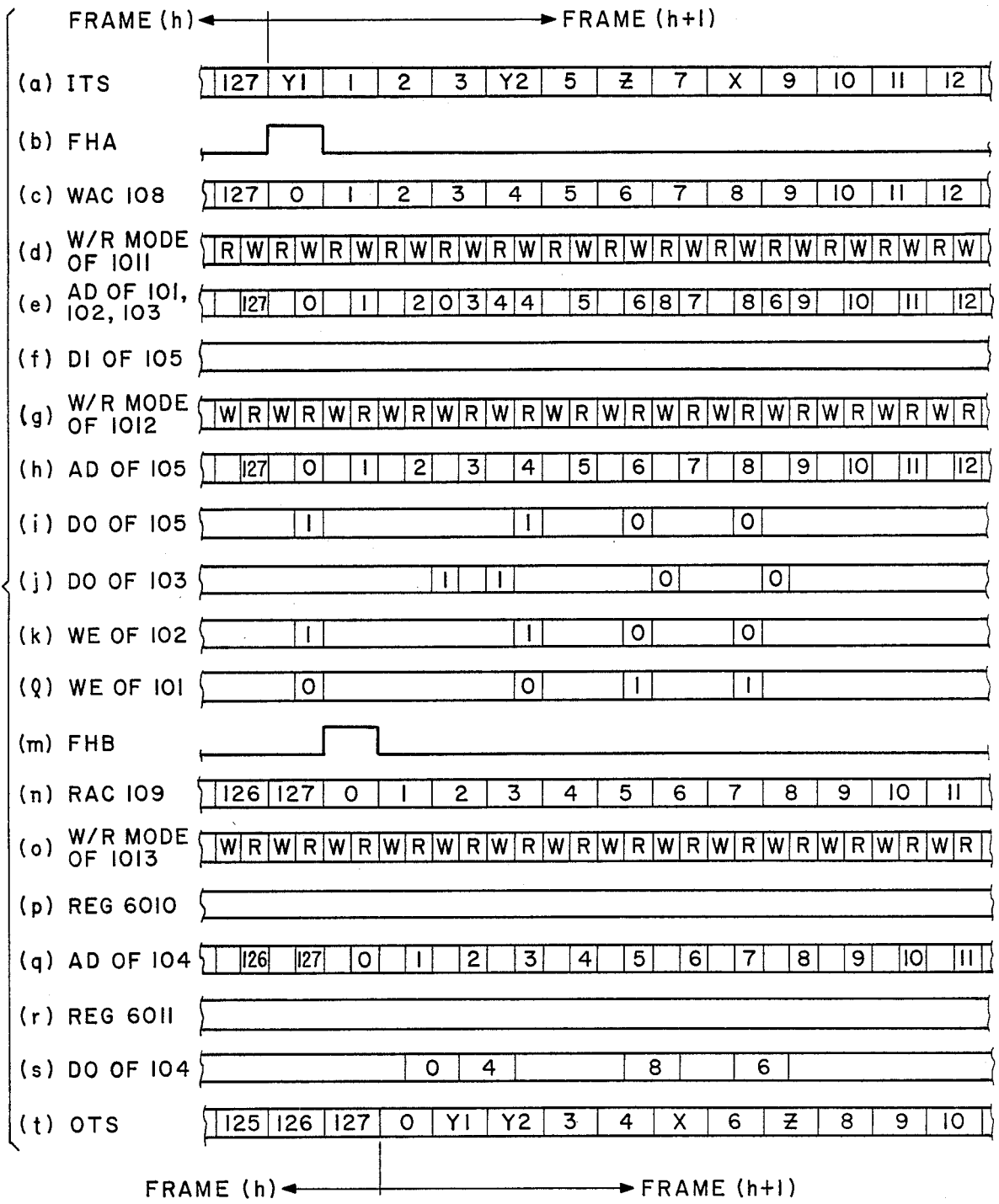

Referring to FIG. 13, it is supposed that, when frame (h) is started on the input side of the time division switch, the FF 1060 of the write control circuit WCTL 106 is reset by the FHA pulse (FIG. 13(b)) at the beginning of the frame (h).

In the frame (h), the count output (FIG. 13(c)) of the write address counter (FIGS. 6, 8) is successively supplied to the memory switches MS 101 and 102 via the W terminal of the selector 1011 as the write address (FIG. 13(e)). Data in the input time slots ITSs are written into the MS 101 or 102. At this time, the count output of the WAC 108 is supplied to the AD terminal of the MEM 105 via the R terminal of the selector 1012 (FIG. 13(h)). At count 0 of the WAC 108 for instance, the multi-element information MEI "1" in the address "0" of the MEM 105 is read out, and entered into the write control circuit WCTL 106 (FIG. 13(e)).

As a result, according to the table of FIG. 9, the input to the WE (write enable) terminal of the memory switch MS 101 turns "1" (FIG. 13(l)), and the data Y1 of the input time slot number ITSNO.0 (the data of HW0 CH0) is written in, while the input to the WE terminal of the MS 102 turns "0", so that writing is prohibited (FIG. 13(k)). At the same time, the MEI "1" which is read out of the MEM 105 is inputted to the MEM 103 and stored at the address "0" (i.e. ITSNO 0). Similarly, at counts "4", "6" and "8" of the WAC 108, the MEI's "1", "0" and "0" are read out of the addresses "4", "6" and "8", respectively, of the MEM 105, the MS 101 being always selected by the same means to write in data Y2, Z and X of the ITSNO's 4, 6 and 8 (i.e. HW0 CH1, HW2 CH1 and HW0 CH2). At the same time, the MEI's "1", "0" and "0" are stored in the addresses "4", "6" and "8", respectively, of the MEM 103 (i.e. the ITSNO's 4, 6 and 8).

Meanwhile, at count "1" of the read address counter RAC 109 (FIG. 13(n)), count "1" is supplied to the control memory CM 104 (FIG. 6) as the read address (FIG. 13(q)) count "1" is supplied by the read mode of the selector 1013 in order to read out an input time slot ITS data "0" (FIG. 13(s)). This data "0" is supplied to the memory switches MS's 101 and 102 and multi-element information memory the MEM 103 as the read address by the read mode of the selector 1011 (FIG. 13(e)). Whereas the MS's 101 and 102 read out the data Y1 in accordance with this address data "0", the MEI "1" stored at the address "0" of the MEM 103 (FIG. 13(j)) causes the AND gate 1076 of the selector 1075 to be opened in the selector control circuit SCTL 107 as shown in FIG. 10. The output of the MS 102 is selected to supply the data Y1 to the output time slot number OTSNO 1 (FIG. 13(t)). Similarly, at count "2" of the read address counter RAC 109, the count "2" is supplied to the AD terminal of the CM 104 to read out data "4". This data "4" is supplied to the AD terminals of the MS's 101 and 102 and the MEM 103. In accordance with an output MEI "1" of the MEM 103, the output of the MS 102 is selected by the SCTL 107 to output the data Y2 to the OTSNO 2. The data Y1 and Y2 stored in the MS 102 are data written in the preceding frame (h−1).

Meanwhile at counts "5" and "7" of the RAC 109, these counts "5" and "7" are supplied to the AD terminal of the control memory CM 104 to read out data "8" and "6", respectively. These data "8" and "6" are supplied to the AD terminals of the memory switches MS's 101 and 102 and the MEM 103. The multi-element information output MEI "0" (both) of the MEM 103 cause the selector control circuit SCTL 107 to select the output of the MS 101, so that data X and Z are outputted to the OTSNO's 5 and 7, respectively. The data Z outputted here is the data just written into the MS 101 in frame (h) at count "6" of the write address counter WAC 108 as mentioned above, with little delay due to time slot conversion. As the outputted data X has not been written into the MS 101 in frame (h), it is taken as data written in the preceding frame (h−1), with the result that the delay due to time slot conversion is close to its maximum, 125 microseconds.

Next will be described the operation in frame (h+1) with reference to FIG. 14. The FHA pulse and the FHB pulse, which are supplied when the process moves ahead from frame (h) to frame (h+1), set and reset the FF 1060 (FIG. 8) of the write control circuit WCTL 106 and the FF 1070 of the selector control circuit SCTL 107, respectively. The operations of write address supply and read address supply to the memory switches MS's 101 and 102 (FIG. 6) and the multi-element information memory MEM 103 are exactly the same as in the preceding frame (h). However, when data Y1 and Y2 are written in at counts "0" and "4" of the WAC 108, respectively, the WCTL 106 sets, in response to the output data (the MEI) "1" from the MEM 105 (FIG. 14(i)), the MS 102 in the write state (WE="1") and the MS 101 in the write prohibit state (WE="0"). This setting is converse to the setting in the preceding frame (h) (FIGS. 14 (k) and (l)). Further, when the data Y1 and Y2 are read out at counts "1" and "2" of the RAC 109, respectively, the SCTL 107 selects the output of the MS 101 and outputs the data Y1 and Y2 to the OTSNO's 1 and 2, respectively, in response to output data (the MEI) "1" from the MEM 103 having output data "0" and "4" from the CM 104 as addresses. This selection is converse to the selection in the preceding frame (h). Thus for the data Y1 and Y2 which require switching at 64K b/s×2, writing is done into the MS 101 or 102 alternately on a frame-by-frame basis. reading is done from the MS 101 or 102 whichever is not currently being written into. As regards the data Z and X calling for switching at 64K b/s, the MS 101 is used for both writing and reading always, but never is the MS 102 so used.

Figure 16:
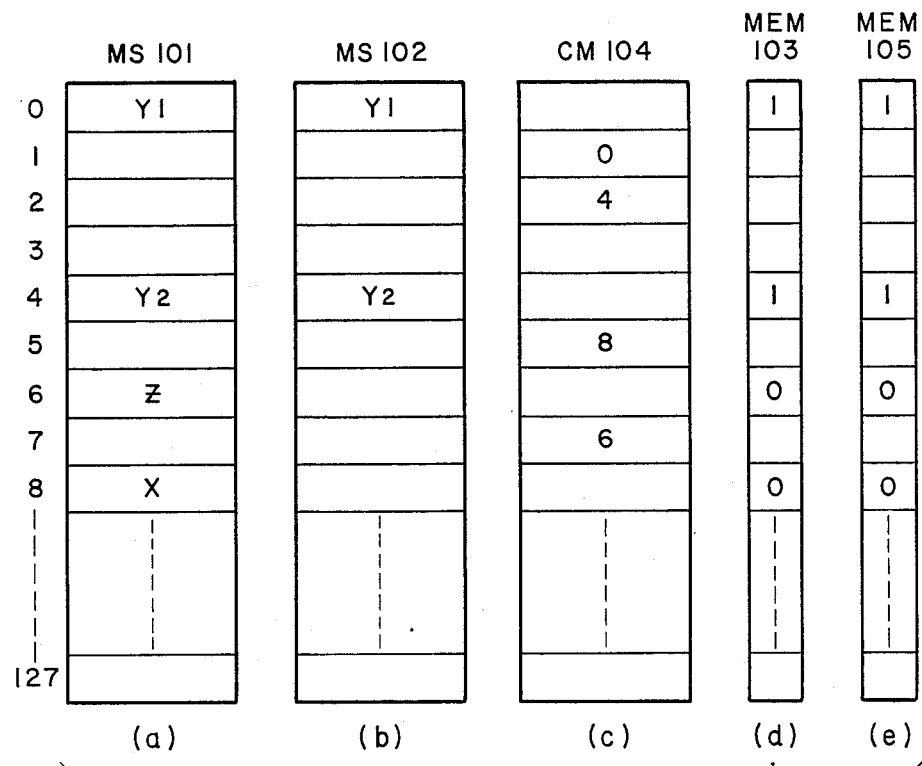

The states of storage in the memories 101 to 105 (FIG. 6) when connected to time division lines are shown in FIG. 16. The operation of the time division switch in frame (h+2) immediately following frame (h+1) is the same as in frame (h) as long as line connections remain the same. Thus, frame (h) can be considered representative of even number frames and frame (h+1), of odd number frames.

In the foregoing description, the data transmission speed for the data terminal was supposed to be 64K b/s×2=128 K b/s, but the applicability of the present invention is not limited to this transmission speed. Thus, the same benefit can be achieved when switching service is to be done at a speed above the data switching speed of the time division switch. It also is obvious to one skilled in the art that, though the memories are described as being separately structured, areas in a large capacity memory may be shared for different purposes.

What is claimed is:

1. A double-buffered time division switching system comprising:
    first and second K-bit×N-multiplex memory switches, into whose N time slots per frame are sequentially inputted time division multiplexed data, either of said memory switches may be placed in a write state;
    a control memory for storing the read sequence of data in said first and secont memory switches;
    first and second multi-element information memories for storing multi-element information which indicates, corresponding to a plurality of input time slots constituting a series of data in said frame, that these time slots are multi-element data;
    first control means for checking said first multi-element information memory in synchronism with the writing of input time slots into said memory switches and, if said multi-element information is stored corresponding to the time slots into which to write in said information, alternately switching the data writing of the time slots between said first and second memory switches on a frame-by-frame basis; and
    second control means for checking said second multi-element information memory in synchronism with the reading into output time slots from said memory switches and, if said multi-element information is stored corresponding to the time slots to output said information, alternately outputting into the output time slots data which is read out of said first memory switch and data which is read out of said second memory switch on a frame-by-frame basis.

2. A double-buffered time division switching system, as claimed in claim 1, wherein said multi-element information consists of L-bit data, said first and second multi-element information memories consist of L-bit×N-multiplex memories, and each of N addresses in these memories corresponds to the input time slot.

3. A double-buffered time division switching system, as claimed in claim 2, further including an N-nary counter, whose output is supplied to said first and second memory switches and second multi-element information memory as the write address and to said first multi-element information memory as the read address, wherein said multi-element information is read out of said first multi-element information memory to be supplied to said first control means and, at the same time, this information is written into said second multi-element information memory.

4. A double-buffered time division switching system, as claimed in claim 3, wherein the addresses of said first and second memory switches and of said second multi-element information memory consist of M-bit data, and said control memory consists of an M-bit×N-multiplex memory, which stores the read addresses of said first and second memory switches and second multi-element information memory corresponding to output time slot numbers.

5. A double-buffered time division switching system, as claimed in claim 4, further including means to discriminate a given input time slot to be said multi-element data, to supply the write address input of said control memory with an output time slot number selected corresponding to said input time slot, to supply the data input of said control memory with said input time slot number and, at the same time, to supply said first multi-element information memory with said input time slot number as the write address input and further with said multi-element information as the data input.

6. A time division switching system for transmitting both voice and data signals, said data signals having a transmission speed which is higher than the transmission speed of said voice signals, said switching system comprising first and second memory switches for transmitting data in a plurality to time frames, a pair of multi-element information memories for storing data signals, and control means responsive to information contained in said data signals for writing said data from said multi-element information into said memory switches, whereby said writing of said data does not have to be carried out in a cyclically periodic manner, said control means alternatingly writing parts of one of the data into the first and second memory switches whereby the parts of data stored in said first and second memory switches corresponds to said one data, said control means reading out said memory switches so that said corresponding data is sent in separate time slots in the same time frame.

7. The system of claim 6 wherein said voice and data signals are received in input time slots with said information contained in said data signals including input time slot designating members, and means responsive to said input time slot designating members for causing said corresponding data to be transmitted in output time slots of the same frame.

8. The system of claim 7 and selector control circuit means for assembling said corresponding data for transmission, and means responsive to said input time slot designating numbers for operating said selector control means.

9. The system of claim 8 and a switching matrix comprising primary, secondary and tertiary switching stages, said primary and tertiary switching stages being time division switches transmitting in said time slots and said secondary switching stage being a space division switch; said memory switches, multi-element information memories and control means being in said primary switching stage; and an inverse combination of the memory switches, multi-element information memories and control means in said tertiary switching stage.

10. The system of claim 6 wherein said data signals do not necessarily have data words of the same length.

11. The system of claim 6 wherein said data signals have a transmission speed which is twice the transmission speed of said voice signals.

* * * * *